(12) United States Patent
Wilms et al.

(10) Patent No.: US 8,272,096 B2
(45) Date of Patent: Sep. 25, 2012

(54) WIPER BLADE

(75) Inventors: Christian Wilms, Koersel-Beringen (BE); Eric Windmolders, Kermt (BE); Erik Kinnaert, Tienen (BE); Dave Claes, Tildonk (BE)

(73) Assignee: Robert Bosch GmbH, Stuttgart (DE)

( * ) Notice: Subject to any disclaimer, the term of this patent is extended or adjusted under 35 U.S.C. 154(b) by 1063 days.

(21) Appl. No.: 11/912,416

(22) PCT Filed: Mar. 16, 2006
(Under 37 CFR 1.47)

(86) PCT No.: PCT/EP2006/060795
§ 371 (c)(1),
(2), (4) Date: Aug. 28, 2008

(87) PCT Pub. No.: WO2006/114355
PCT Pub. Date: Nov. 2, 2006

(65) Prior Publication Data
US 2011/0126372 A1    Jun. 2, 2011

(30) Foreign Application Priority Data
Apr. 28, 2005 (DE) .......................... 10 2005 019 389

(51) Int. Cl.
*B60S 1/40* (2006.01)
*B60S 1/34* (2006.01)
(52) U.S. Cl. .............. 15/250.32; 15/250.351; 15/250.43
(58) Field of Classification Search ............... 15/250.32, 15/250.43, 250.44, 250.201, 250.31, 250.351
See application file for complete search history.

(56) References Cited

U.S. PATENT DOCUMENTS

| 6,161,249 A * | 12/2000 | Hussaini ..................... 15/250.32 |
| 2004/0117938 A1 * | 6/2004 | Wilms et al. ............... 15/250.32 |
| 2004/0250369 A1 | 12/2004 | Matsumoto et al. |

FOREIGN PATENT DOCUMENTS

| DE | 10113680 A1 | 10/2002 |
| DE | 10160111 A1 | 7/2003 |
| DE | 10163221 * | 7/2003 |
| DE | 10305322 A1 | 1/2004 |
| DE | 10330218 A1 | 1/2005 |
| EP | 1323601 A2 | 7/2003 |
| FR | 2846617 | 5/2004 |
| GB | 2140287 A | 11/1984 |
| JP | 2004217102 A | 8/2004 |

OTHER PUBLICATIONS

PCT/EP2006/060795 International Search Report.

\* cited by examiner

*Primary Examiner* — Gary Graham
(74) *Attorney, Agent, or Firm* — Michael Best & Friedrich LLP

(57) ABSTRACT

The invention relates to a wiper blade (10) consisting of a rubber profiled element (48) comprising a wiper lip (50) and at least one carrier element (46) that can be connected to a wiper arm (18) by means of a fixing element (14) and a connection element (22). The fixing element (14) comprises a covering cap (16) and the connection element (22) fixed to the wiper arm (18) secures the wiper blade (10) perpendicularly to a pivoting axis (20) by means of a clip (52), on the end (54) thereof at an angle to the wiper blade. According to the invention, the covering cap (16) comprises an opening (34) or recess for the angular end (54) of the clip (52), on the side of the cap opposing the rubber profiled element (48), in the region of the connection element (22), said opening only partially overlapping the covering cap (16) in the mounted position.

23 Claims, 4 Drawing Sheets

WIPER BLADE

BACKGROUND OF THE INVENTION

The invention-relates to a wiper blade.

A windshield wiper with a wiper blade, which is connected in an articulated manner to a wiper arm via a so-called sidelock system, is known from DE 101 13 680 A1. This is accomplished by a fixing element, whose formed-on form closure elements clasp the resilient rails of the wiper blade that serve as a support element laterally and from below. A covering cap made of plastic covers the fixing element that is manufactured of sheet metal as a rule. A connection element connected to the free end of the wiper arm, e.g., a wiper rod of the wiper arm, has a bearing pin, which is inserted into the connection element laterally and transverse to the longitudinal direction of the wiper arm and pointing towards the wiper blade and is preferably welded or riveted. The bearing pin is pivoted in a bearing borehole of the fixing element. The connection element can be manufactured separately in one piece with the bearing pin and a securing element in the form of a clip using casting or injection molding and can be slid on the end of the rectangular (in cross section) wiper rod of the wiper arm and be fastened there.

Arranged parallel to the bearing pin on the connection element in the longitudinal direction offset towards the drive end is the clip, which is bent on its free end towards the side of the wiper blade. In an assembly position in which the wiper blade is held transverse to the longitudinal direction of the wiper arm, the bearing pin can be slid into a bearing borehole of the fixing element. If the wiper blade is then rotated parallel to the longitudinal direction of the wiper arm, the clip grips over the covering cap and the fixing element and locks it with its bent end so that lateral guide surfaces of the covering cap are guided in a mounted state between the bent end of the bridge element and an opposing surface of the connection element. When the wiper blade is in an operating position, the clip dips into a corresponding groove on the upper side of the covering cap and terminates approximately flush with it. For disassembly, the wiper blade must be swiveled in the opposite direction until the bent end is disengaged and the wiper blade can be pulled from the bearing pin. The wiper blade has a spoiler on its upper side. With an increasing air stream, it increases the application force of the wiper blade against the vehicle window. In the direction of the fixing element, the spoiler grips into recesses of the fixing element, which are adapted to the outer contour of the spoiler. The wiper arm or the wiper rod lies on the inflow side of the spoiler and partially covers said spoiler.

GB 2 140 287 B discloses a windshield wiper with a wiper blade, whose supporting bracket system is connected in an articulated manner to a wiper rod of a wiper arm according to the sidelock principle. The wiper blade has a spoiler on both sides of the sidelock connection, whereby the wiper arm is arranged with its wiper rod on the inflow side of the spoiler and of the wiper blade. The wiper rod, which is firmly connected on one end to an articulated part of the wiper arm, has a rectangular cross section, whose wide side runs on the ends approximately parallel to the vehicle window, while between the end regions it is rotated around the longitudinal axis such that it runs inclined to the vehicle window to support the spoiler. Embodiments are also known in which the wiper rod is straight and the inclination toward the vehicle window is achieved by a corresponding design of the articulated part and a correspondingly designed connection element on the other end of the wiper rod.

SUMMARY OF THE INVENTION

According to the invention, the covering cap features an opening or recess for the bent leg of the clip on its side facing away from the rubber profile in the region of the clip element, which clip only partially overlaps the covering cap in the mounted position. As a result, this prevents water from spraying back onto the cleaned vehicle window during the downward movement of the wiper blade into the lower reversal position or parking position. Furthermore, it is advantageous that a covering wall of the covering cap beneath the clip element slopes from the opening towards the outside inclined towards the inflow direction so that water can flow off better towards the downwardly pointed side of the wiper blade and can be washed downwardly away. In order to improve the lateral guidance of the wiper blade by the connection element, it is expedient for the covering cap to have guide ribs on the opening or the recess and on an outer side that faces the wiper arm, on which the bent end of the clip or the wiper rod or the connection element abuts. The guide ribs can be manufactured with a slight play with respect to the connection element or wiper arm without negatively impacting the ease of the swivel movement of the wiper blade. The guide ribs on the outer side of the covering cap also prevent incorrect assembly. They make sure that the bearing pin can be inserted a maximum of three millimeters into the bearing opening if one attempts to mount the wiper blade parallel to the wiper arm.

If the wiper blade has a spoiler, the covering cap blends expediently on its ends with a connecting profile harmoniously into the profile of the spoiler so that the effect of the spoiler is disturbed as little as possible by the fixing element and the covering cap. Also serving this purpose is the fact that the wiper rod of the wiper arm, which has a rectangular cross section, when it runs on the inflow side of the wiper blade is rotated around its longitudinal axis in such a way that, at least in the region of the wiper blade, its wide side for supporting the spoiler runs inclined to the inflow direction and its end is arranged with the wide side parallel to the guide ribs on the outer side of the covering cap.

The connection element can be fastened to the wiper rod in a simple manner, if, in accordance with an embodiment of the invention, it has a fastening plate running parallel to a wide side of the wiper rod, on which fastening plate the clip is formed. In this case the bearing pin has a rivet pin on one end, with which the fastening plate is fastened to the wiper rod. The rivet pin, which can be pre-mounted in an advantageous manner in the fastening plate by means of a press fit, is inserted through an opening on the end of the wiper rod and riveted or wobbled. To prevent the fastening plate from twisting with respect to the wiper rod under stress during wiper operation, the connection element has, on its longitudinal sides, bracket-like edges that are bent towards the wiper rod, which abut the outer contour of the end of the wiper rod with a press fit in the region of its rounded tips. As a result, the clearance between the bracket-like edges is less than the width of the end of the wiper rod so that a press fit results when they are joined transverse to the wiper rod. Another possibility consists of the clearance between the bracket-like edges being greater than the width of the end of the wiper rod so that the press fit is produced by crimping the bracket-like edges.

The fastening plate expediently overlaps the front side of the end of the wiper rod with a front angle. As a result, any sharp edges on the wiper rod are covered.

In order to achieve a shape of the connection between the connection element and the wiper rod that is favorable for the airflow and to improve the design of the wiper blade, it is proposed in accordance with another embodiment of the invention that the fastening plate be attached on the inner side of the end of the wiper rod and a covering be provided on the opposite outer side. A front wall of said covering expediently covers the front side of the end of the wiper rod and of the connection element. The covering can be fastened on the end of the wiper rod in that a snap-in peg of the covering is clipped into a snap-in hole of the end of the wiper rod. Clipping devices can also be attached on the edges of the covering.

BRIEF DESCRIPTION OF THE DRAWINGS

Additional advantages are yielded from the following description of the drawings. Exemplary embodiments of the invention are depicted in the drawings. The drawings, the description and the claims contain numerous features in combination. The person skilled in the art will also observe individual features expediently and combine them into additional, meaningful combinations.

The drawings show.

DETAILED DESCRIPTION

Figure 1:
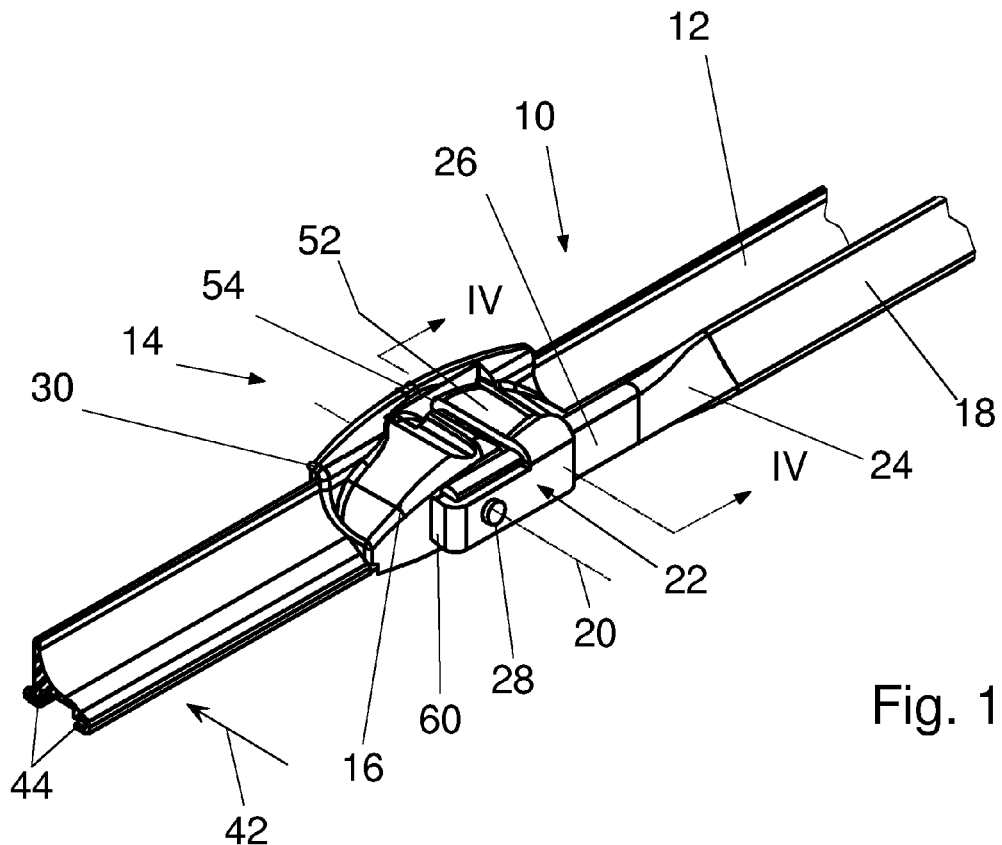
FIG. 1 A perspective partial view of a wiper blade on a wiper rod
Figure 2:
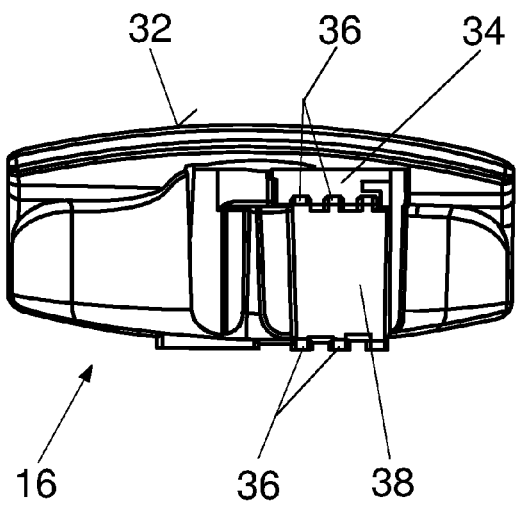
FIG. 2 A top view of a covering cap of a connection element
Figure 3:
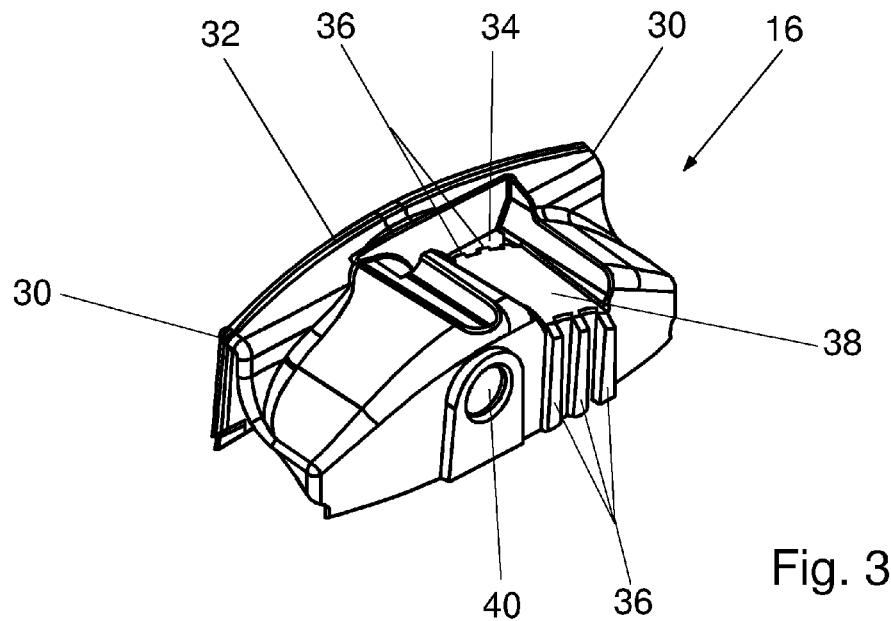
FIG. 3 A perspective view of a covering cap according to FIG. 2

FIG. 1 depicts the following parts of a wiper blade 10: a spoiler 12 and a fixing element 14 with a covering cap 16. A wiper arm with its wiper rod 18 is coupled to the fixing element 14 in accordance with the sidelock principle so that it can pivot around a pivoting axis 20. The wiper arm and the wiper rod 18 run essentially parallel to the wiper blade 10. If the wiper rod 18 runs on the inflow side of the wiper blade 10, the wiper rod is twisted around the longitudinal axis in the region of the wiper blade 10 in such a way that the wide side of its rectangular cross section profile runs inclined toward an inflow direction 42 of the spoiler 12, thereby supporting its effect. In a transitional area 24 towards an end 26 of the wiper rod 18, this is also twisted in such a way that the wide side of the end 26 runs approximately parallel to the neighboring side wall of the covering cap 16, which features guide ribs 36 for lateral guidance of the wiper blade 10 (FIG. 3).

Connected to the end 26 of the wiper rod 18 is a connection element 22, which partially overlaps the covering cap 16 with a clip 52 opposite from the pivoting axis 20 in the longitudinal direction offset towards the drive end of the wiper rod 18. A bent end 54 of the clip 52 dips into an opening 34 of the covering cap 16. The opening 34 also has guide ribs 36 on the side facing the wiper rod 18 so that the wiper blade 10 is guided through the clip 52 laterally as well as is locked in the longitudinal direction of the pivoting axis 20 in the operating position depicted in FIG. 1 and FIG. 4. As a result, the covering cap 16 acquires a continuous smooth outer wall 32 on the inflow side on which no water can accumulate. Furthermore, it connects the connecting profile 30 harmoniously to the ends of the covering cap 16, into which the spoiler 12 is fit. The connecting profiles 30 together with the outer wall 32 produce a covering cap 16 that is favorable for the airflow, thereby supporting the effectiveness of the spoiler 12. The covering cap 16 has a bearing opening 40 in the region of the pivoting axis 20 through which a bearing pin 28 is guided, which is firmly connected either to the fixing element 14 or the wiper rod 18, while it is pivoted in the respective other part. So that the water can flow off well on the inflow side, the covering cap 16 is expediently open towards the vehicle window at least in the region of the opening 34.

In the depicted exemplary embodiments, the bearing pin 28 has a rivet pin 62, which is inserted through a borehole in the fastening plate 56 of the connection element 22 and the wiper rod 18 and riveted during assembly. The covering cap 16 has a covering wall 38 on its upper side in the region of the clip element 22, and said wall is expediently downwardly inclined towards the wiper rod 18 so that when it is raining water can easily drain off from the covering cap 16 towards the wiper arm side.

Figure 4:
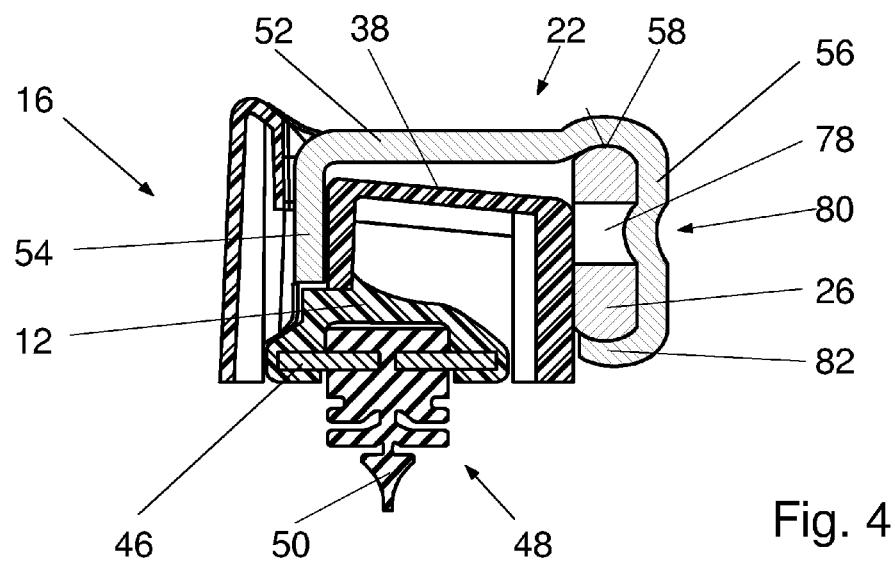
FIG. 4 A section corresponding to Line IV-IV in FIG. 1

The spoiler 12 has two opposing, inwardly open, longitudinal grooves 44 towards a rubber profiled element 48 (FIG. 4). These grooves each accommodate a resilient rail 46, which serve as supporting elements for the rubber profiled element 48. The resilient rails 46 are pre-bent in such a way that, under the application force of the wiper rod 18, they press the rubber profiled element 48 with a wiper lip 50 uniformly against a vehicle window (not shown).

In the case of the connection element 22 according to FIG. 1 and FIG. 4, its fastening plate 56 is attached on the outer side of the end 26 of the wiper rod 18. In the process, the clip 52 grips over the end 26 and follows the contour of the rounded tip 58 of the wiper rod 18, which is therewith embedded with a form fit in the clip. A rivet pin 62 on the end of a bearing pin 28 is used to fix the connection element 22 on the wiper rod 18. This rivet pin is inserted through a borehole in the wiper rod 18 and in the fastening plate 56 and subsequently riveted or wobbled. In addition, the wiper rod 18 can have a hole 78 offset in the longitudinal direction from the rivet pin in which an indentation 80 of the fastening plate 56 engages. Moreover, on the narrow side of the end 26 of the wiper rod 18 that is opposite from the clip 52, the fastening plate 56 can have an additional bracket 82, which abuts the end 26. In the embodiment according to FIG. 1, the fastening element 22 has a front angle 60 in the extension of the wiper rod, which covers the front side of the end 26 of the wiper rod 18 and covers any sharp edges.

Figure 5:
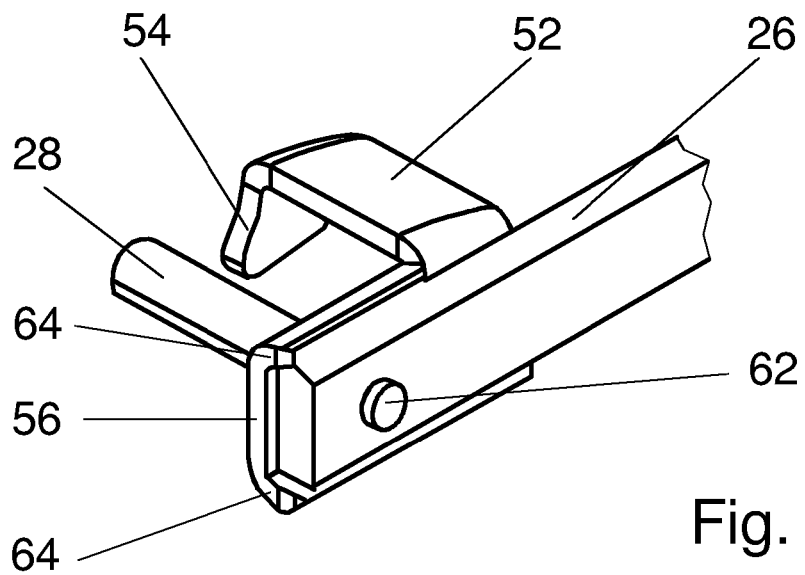
FIG. 5 A perspective partial view of a connection element on a wiper rod
Figure 6:
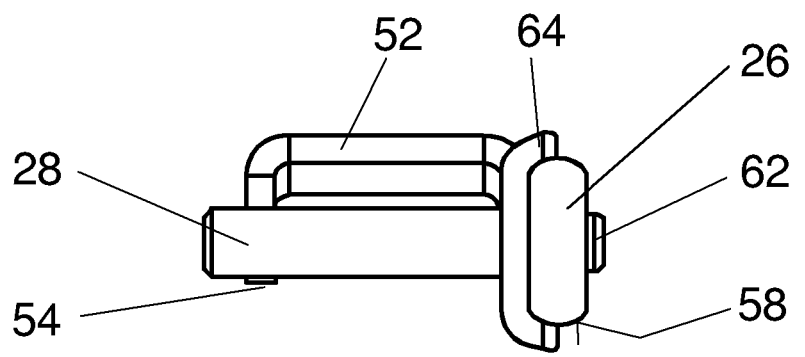
FIG. 6 A view in the longitudinal direction of the wiper arm
Figure 7:
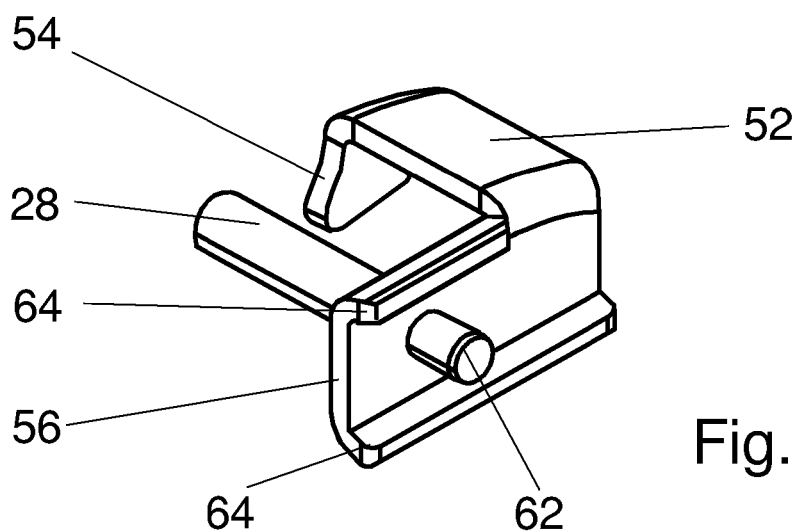
FIG. 7 A perspective partial view of a connection element without a wiper rod
Figure 8:
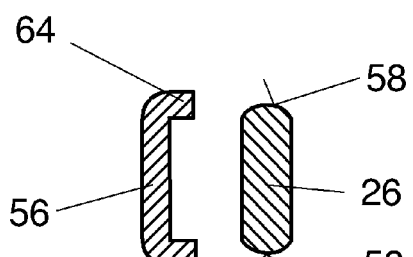
FIG. 8 An assembly cross section through a connection element and a wiper rod
Figure 9:
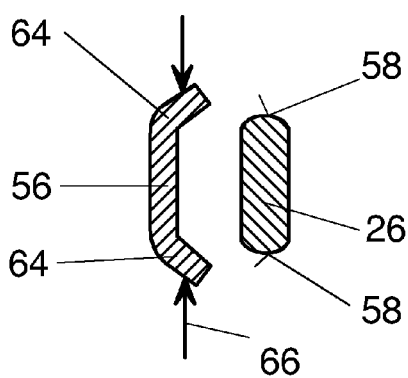
FIG. 9 A variation of FIG. 8

In the case of the embodiment according to FIG. 5, the fastening plate 56 is arranged on the inner side of the end 26 of the wiper rod 18. On its longitudinal sides it has bracket-like edges 64 or brackets, which are bent toward the end 26 of the wiper rod 18. Thus, the clearance between the bracket-like edges 64 can be less than the width of the end 26 of the wiper rod 18. In this case, the fastening plate is pressed over the wiper rod so that a press fit is produced between the edges 64 and the rounded tips 58 of the end 26 of the wiper rod 18 (FIG. 8). Another possibility consists of the clearance between the edges 64 being greater than the width of the wiper rod. The edges 64 are then crimped with the end 26 during assembly so that a press fit is produced on its bearing surfaces (FIG. 9). In order to facilitate the crimping, it is advantageous if the bearing pin 28 with its rivet pin 62 is pre-mounted with a press fit in the fastening plate. The bracket-like edges 64 can grip around the cross-sectional profile of the end 26 of the wiper rod 18 enough that the connection element 22 is secured with form closure in the direction of the bearing pin 28.

Figure 10:
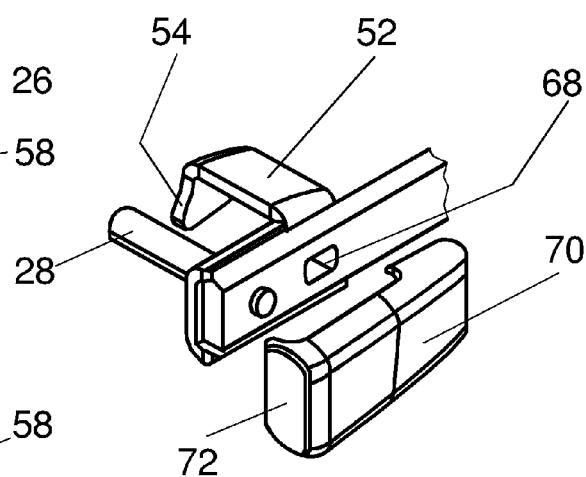
FIG. 10 A partially exploded depiction of a connection element with a wiper rod and a covering FIG. 11 A variation of FIG. 5

In order to provide the connection between the connection element 22 and the end 26 of the wiper rod 18 with a profile that is favorable for the airflow and to improve the design of the windshield wiper, a covering 70 is provided (FIG. 10) on the end 26 of the wiper rod 18, which is expediently clipped on the end 26 of the wiper rod with a snap-in peg (not shown) in a snap-in hole 68 of the wiper rod 18. The covering is harmoniously adjacent to the connection element 22 and covers the front sides of the end 26 of the wiper rod 18 and of the connection element 22 with a front wall 72.

Figure 11:
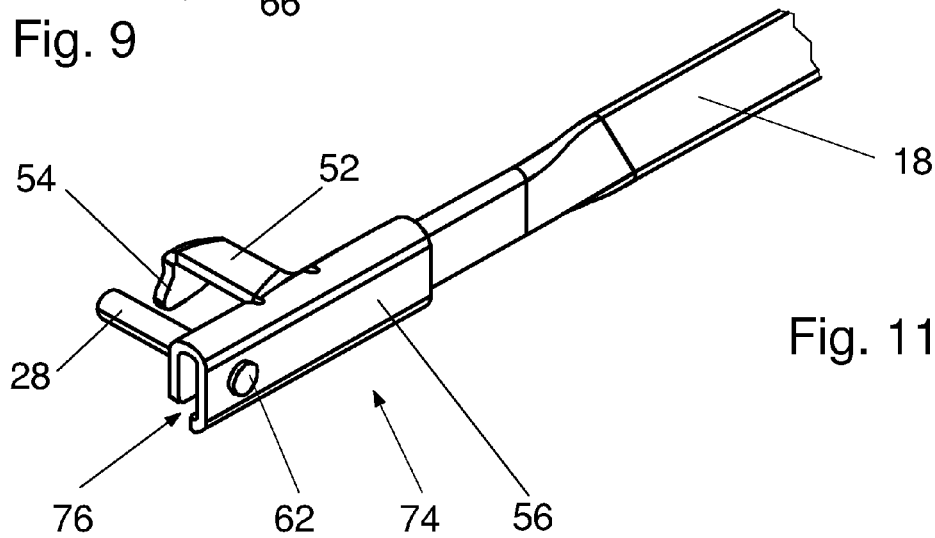

In the case of the embodiment according to FIG. 11, the connection element 76 encircles the end 26 of the wiper rod 18 on its two wide ends. It forms an open profile 76, of which at least one side wall serves as a fastening plate 56. The cross-sectional profile 76 is closely adapted to the profile of the end 26 of the wiper rod 18. It can be slid over the end 26 starting from the front side and is then crimped with the end 26 of the wiper rod 18. In order to guarantee a firm fit on the wiper rod 18 and support the frictional connection via a form closure, warts or projections that act in a similar manner (not shown) are provided on the wiper rod 18.

The invention claimed is:

1. Wiper blade (10) constructed of a rubber profiled element (48) comprised of a wiper lip (50) and at least one support element (46) connectable to a wiper arm by a fixing element (14) and a connection element (22), wherein the fixing element (14) has a covering cap (16) and the connection element (22) fastened to the wiper arm secures the wiper blade (10) via a clip (52) transverse to a pivoting axis (20) by an end (54) of the clip (52) that is bent towards the wiper blade (10), characterized in that the covering cap (16) features an opening (34) for the bent end (54) of the clip (52) in a covering wall (38) of the cap (16) facing away from and being on a side of the pivoting axis (20) opposite the rubber profiled element (48) in a region of the connection element (22), the covering wall (38) extending in a direction of the pivoting axis (20), the opening being defined in a portion of the covering wall (38) on a side of a plane of symmetry of the wiper lip (50) opposite the wiper arm, the opening (34) being defined by a wall extending about and completely enclosing its perimeter, the clip only partially overlapping in a direction of the pivoting axis (20) the covering cap (16) in the mounted position.

2. Wiper blade (10) according to claim 1, characterized in that the wiper blade (10) is oriented relative to an air flow flowing in an inflow direction, and in that the covering wall (38) of the covering cap (16) runs beneath the clip (52) and is inclined towards the inflow direction (42).

3. Wiper blade according to claim 2, characterized in that a portion of the wall on a side of the bent end (54) away from the wiper arm extends to a height above the covering wall (38) and above at least a portion of the clip (52) proximate the bent end (54).

4. Wiper blade (10) according to claim 1, characterized in that the wiper arm is connected to the wiper blade (10) in a direction along the pivoting axis (20), the covering cap (16) has guide ribs (36) on the opening (34) and facing away from the wiper arm, and on an outer side that faces the wiper arm, the guide ribs (36) on the opening (34) being engaged by bent end (54), the guide ribs (36) on the outer side being engaged by the wiper arm.

5. Wiper blade (10) according to claim 1, characterized in that a spoiler (12) is provided and the covering cap (16) blends on each of its ends with a connecting profile (30) into a profile of the spoiler (12).

6. Wiper blade (10) according to claim 1, characterized in that the wiper arm comprises a wiper rod (18) with a rectangular cross section, which, in a mounted position runs at least partially on an inflow side of the wiper blade (10) and is twisted around its longitudinal axis in such a way that, at least in a region of the wiper blade (10), a wide side of the wiper rod (18) runs inclined to an inflow direction (42) and its end (26) is arranged with the wide side parallel to guide ribs (36) on an outer side of the covering cap (16).

7. Wiper blade (10) according to claim 1, characterized in that the connection element (22) has a fastening plate (56) running parallel to a wide side of a wiper rod (18), on which fastening plate the clip (52) is formed, wherein a bearing pin (28) has a rivet pin (62) on one end, with which the fastening plate (56) is fastened to the wiper rod (18, 26).

8. Wiper blade (10) according to claim 7, characterized in that the rivet pin (62) is pre-mounted in the fastening plate (56) with a press fit.

9. Wiper blade (10) according to claim 7, characterized in that an end (26) of the wiper rod (18) has a hole (78) offset in the longitudinal direction from the bearing pin (28), in which hole an indentation (80) engages in a mounted state of the connection element (22).

10. Wiper blade (10) according to claim 7, characterized in that the fastening plate (56) overlaps a front side of an end (26) of the wiper rod (18) with a front angle (60).

11. Wiper blade (10) according to claim 7, characterized in that the fastening plate (56) is attached on an outer side of an end (26) of the wiper rod (18) and the clip (52) grips over the end (26) and abuts the rounded tip (58) of the end (26) following a contour.

12. Wiper blade (10) according to claim 11, characterized in that a covering (70) clips into a snap-in hole (68) of the end (26) of the wiper rod (18).

13. Wiper blade (10) according to claim 7, characterized in that the fastening plate (56) is attached on an inner side of an end (26) of the wiper rod (18) and a covering (70) is provided on an opposite side of the end (26).

14. Wiper blade (10) according to claim 13, characterized in that a front wall (72) of the covering (70) covers a front side of the end (26) and of the connection element (22).

15. Wiper blade (10) according to claim 7, characterized in that the fastening plate (56) forms a side wall of an open cross-sectional profile (76) of a connection element (74), which is slid over an end (26) of the wiper rod (18).

16. Wiper blade (10) according to claim 15, characterized in that the connection element (74) is fastened by rivet pins (62) of the bearing pin (28) on the end (26) of the wiper rod (18).

17. Wiper blade according to claim 1, characterized in that a portion of the wall on a side of the bent end (54) away from the wiper arm extends to a height above at least a portion of the clip (52) proximate the bent end (54).

18. Wiper blade (10) constructed of a rubber profiled element (48) comprised of a wiper lip (50) and at least one support element (46) connectable to a wiper arm by a fixing element (14) and a connection element (22), wherein the fixing element (14) has a covering cap (16) and the connection element (22) fastened to the wiper arm secures the wiper blade (10) via a clip (52) transverse to a pivoting axis (20) by an end (54) of the clip (52) that is bent towards the wiper blade (10), characterized in that the covering cap (16) features one of an opening (34) and a recess for the bent end (54) of the clip (52) on a side of the cap (16) facing away from the rubber profiled element (48) in a region of the connection element (22), the clip only partially overlapping the covering cap (16) in the mounted position, in that the connection element (22)

has a fastening plate (56) running parallel to a wide side of a wiper rod (18), on which fastening plate the clip (52) is formed, wherein a bearing pin (28) has a rivet pin (62) on one end, with which the fastening plate (56) is fastened to the wiper rod (18, 26), and in that the connection element (22) has, on its longitudinal sides, edges (64) bent towards the wiper rod (18), which abut an outer contour of an end (26) of the wiper rod (18) with a press fit in a region of its rounded tips (58).

19. Wiper blade (10) according to claim 18, characterized in that a clearance between the edges (64) is less than the width of the end (26) of the wiper rod (18) so that a press fit results when they are joined.

20. Wiper blade (10) according to claim 18, characterized in that a clearance between the edges (64) is greater than the width of the end (26) of the wiper rod (18) so that a press fit is produced by crimping the bracket-like edges (64).

21. Wiper blade (10) constructed of a rubber profiled element (48) comprised of a wiper lip (50) and at least one support element (46) connectable to a wiper arm by a fixing element (14) and a connection element (22), wherein the fixing element (14) has a covering cap (16) and the connection element (22) fastened to the wiper arm secures the wiper blade (10) via a clip (52) transverse to a pivoting axis (20) by an end (54) of the clip (52) that is bent towards the wiper blade (10), characterized in that the covering cap (16) features an opening (34) for the bent end (54) of the clip (52) defined in a covering wall (38) of the cap (16) facing away from and being on a side of the pivoting axis (20) opposite the rubber profiled element (48) in a region of the connection element (22), the covering wall (38) extending between and joining two side walls of the covering cap (16), the opening (34) being defined by a wall extending about its perimeter, a portion of the wall being along a face of the bent end (54) facing away from the wiper arm and extending transverse to the pivoting axis (20), another portion of the wall being along an opposite face of the bent end (54) facing toward the wiper arm, in the mounted position, the clip (52) only partially overlapping in a direction of the pivoting axis (20) the covering cap (16).

22. Wiper blade according to claim 21, characterized in that the wall completely encloses the perimeter of the opening.

23. Wiper blade according to claim 21, characterized in that a portion of the wall on a side of the bent end (54) away from the wiper arm extends to a height above at least a portion of the clip (52) proximate the bent end (54).

\* \* \* \* \*